United States Patent
Epworth et al.

(10) Patent No.: US 7,136,558 B2
(45) Date of Patent: Nov. 14, 2006

(54) OPTICAL WAVEGUIDE

(75) Inventors: Richard E Epworth, Sawbridgeworth (GB); Vincent Handerek, Grays (GB); Alan Robinson, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 13 days.

(21) Appl. No.: 10/425,807

(22) Filed: Apr. 29, 2003

(65) Prior Publication Data

US 2004/0218879 A1    Nov. 4, 2004

(51) Int. Cl.
G02B 6/02 (2006.01)
G02B 6/032 (2006.01)
G02B 6/036 (2006.01)
G02B 6/00 (2006.01)

(52) U.S. Cl. ............... 385/123; 385/122; 385/124; 385/125; 385/126; 385/127; 385/128

(58) Field of Classification Search ............ 385/5, 385/122–128, 141–145
See application file for complete search history.

(56) References Cited

U.S. PATENT DOCUMENTS

| | | | |
|---|---|---|---|
| 5,732,178 A | 3/1998 | Terasawa et al. ........... 385/127 |
| 5,920,588 A * | 7/1999 | Watanabe ................... 372/96 |
| 5,987,201 A * | 11/1999 | Chen ........................... 385/43 |
| 6,614,975 B1 * | 9/2003 | Richardson et al. ....... 385/127 |
| 6,959,027 B1 * | 10/2005 | Guilfoyle et al. .......... 372/50.1 |
| 2002/0061176 A1 * | 5/2002 | Libori et al. ................ 385/125 |
| 2004/0096137 A1 * | 5/2004 | Risser et al. ................. 385/3 |

FOREIGN PATENT DOCUMENTS

| | | | | |
|---|---|---|---|---|
| JP | 2002-040278 | * | 2/2002 | |
| JP | 2002040278 | | 2/2002 | ................ 385/127 |

OTHER PUBLICATIONS

Nakajima K et al: "Dopant Dependence of Effective Nonlinear Refractive Index in $GeO_2$- and F-Doped Core Single-Mode Fibers", IEEE Photonics Technology Letters, Apr. 2002, IEEE, USA, vol. 14, No. 4, Apr. 2002, pp. 492-494.

* cited by examiner

*Primary Examiner*—Kaveh Kianni
*Assistant Examiner*—Derek L. Dupuis
(74) *Attorney, Agent, or Firm*—Barnes & ThornburgLLP

(57) ABSTRACT

An optical fiber for communications systems, the fiber being designed to ensure a compensation of Kerr effects. The fiber has a profile which ensures that changes in power produce changes in distribution of power between core and cladding, such that the phase change associated with the changed spatial distribution of the power, is equal and opposite to the phase change due to Kerr Effect.

24 Claims, 6 Drawing Sheets

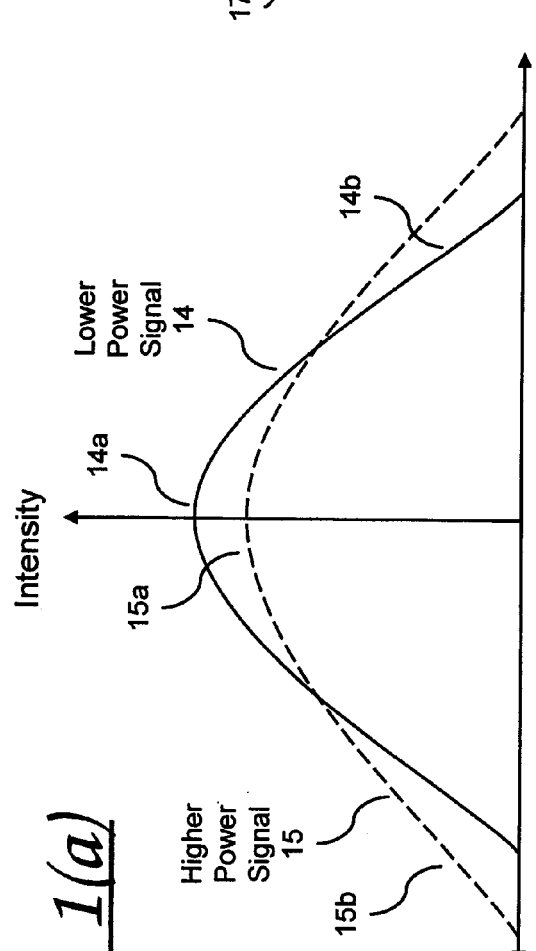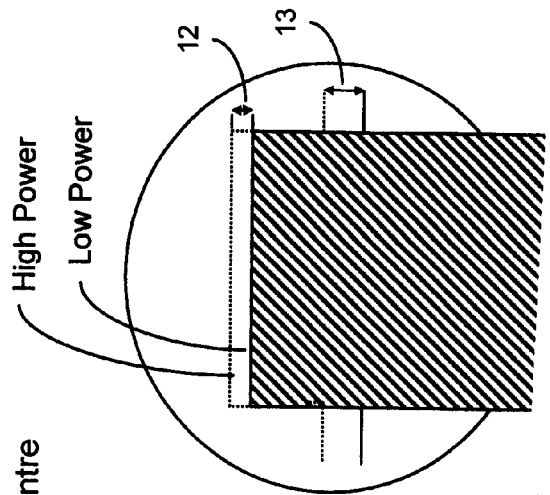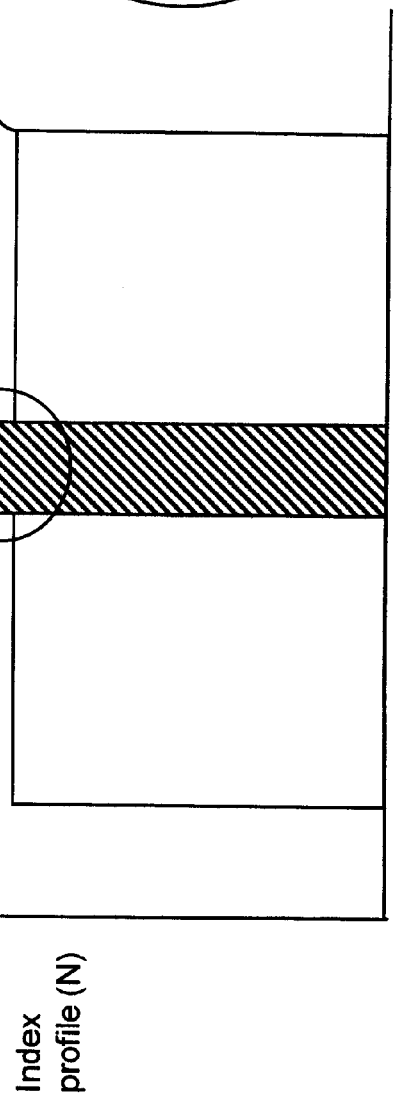

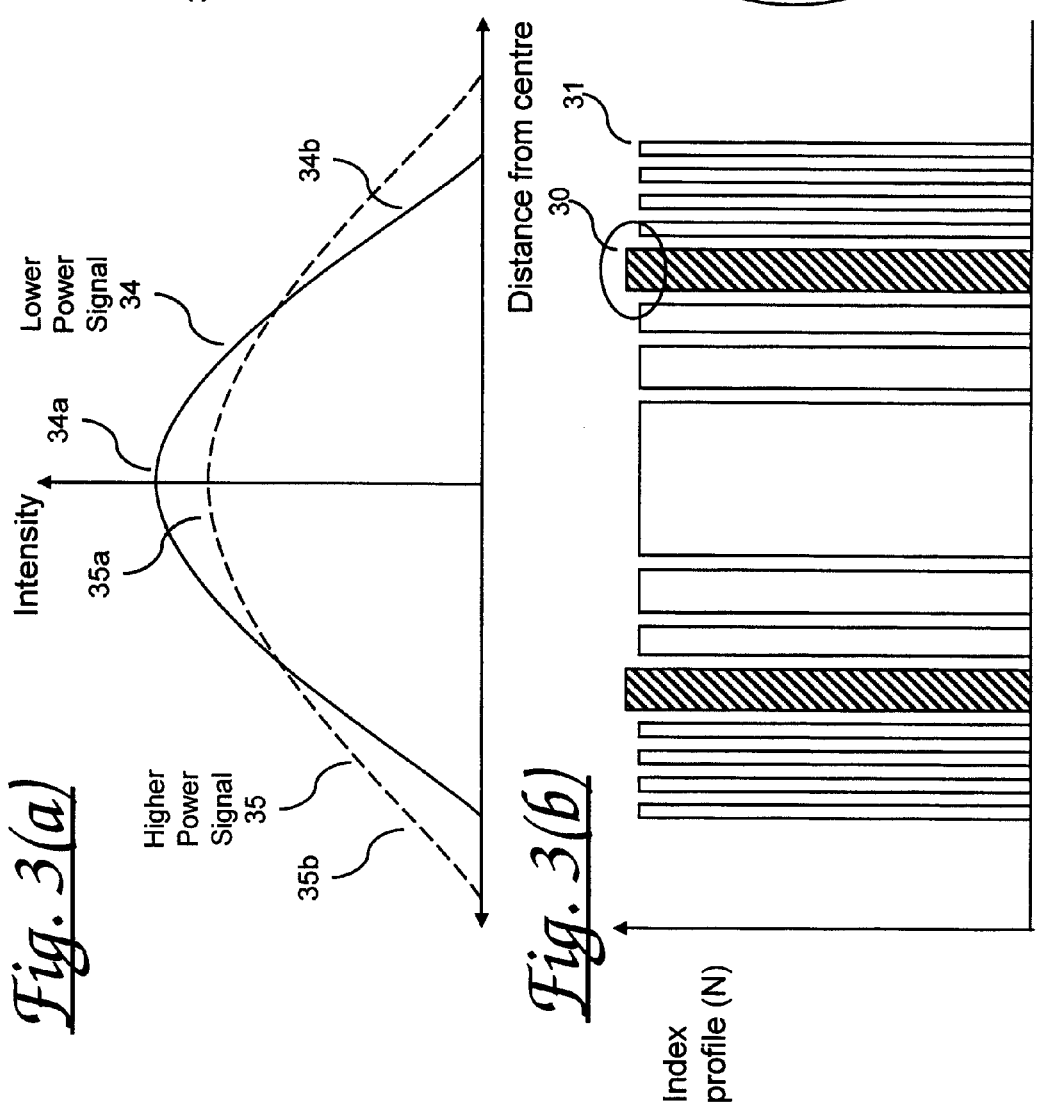

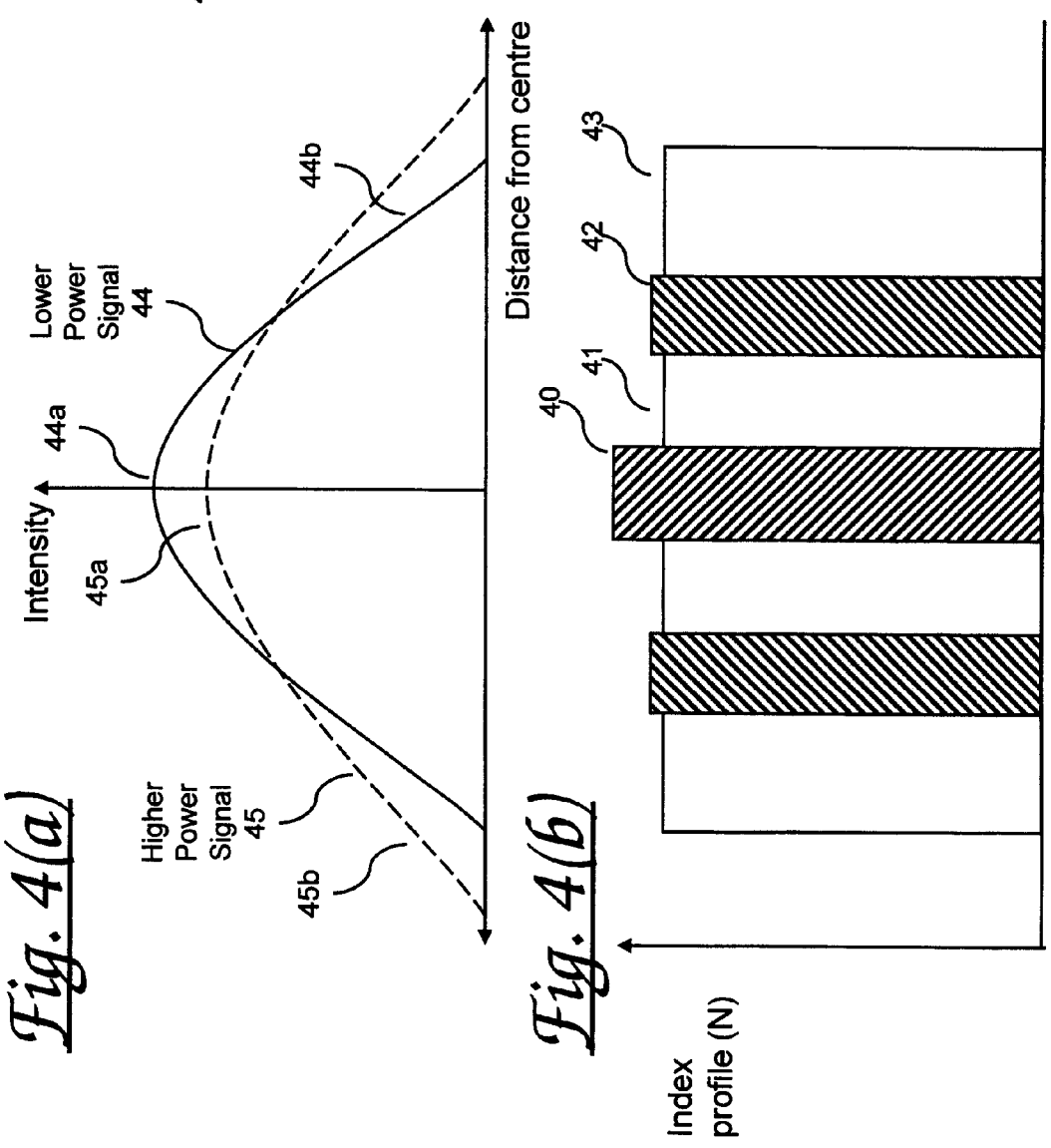
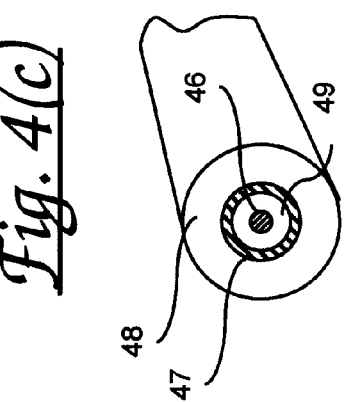

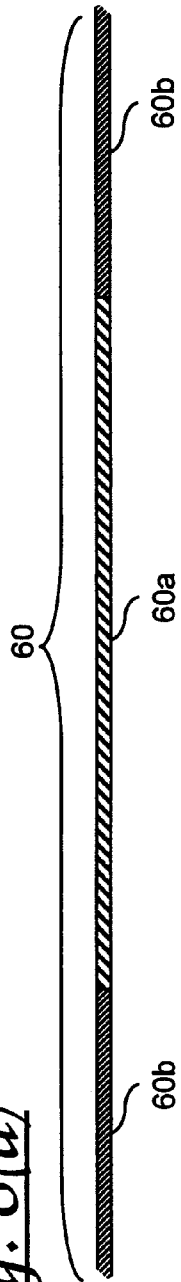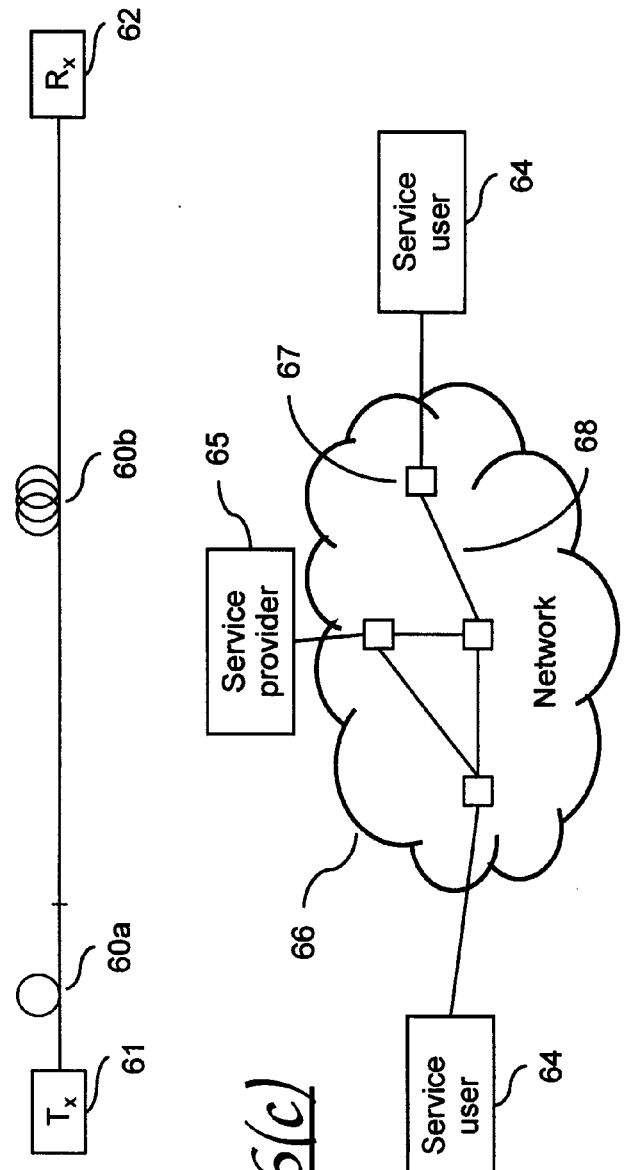
Fig. 6(a)
Fig. 6(b)
Fig. 6(c)

OPTICAL WAVEGUIDE

FIELD OF THE INVENTION

The present invention relates to optical wave guides, in particular optical fibre waveguides, as used for example in optical communications systems, and to related methods and apparatus and to optical signals conveyed over such waveguides.

It is known to use optical communications media to carry optically modulated data over great distances in communications networks. However, known optical media (for example optical fibres) are known to exhibit characteristics which limit the effective distance over which optical signals can be transmitted without requiring detection and regeneration. Such characteristics include those induced by the Kerr Effect, by which the refractive index of an optical medium varies according to the intensity of the optical signal conveyed through the medium. Where the signal is a compound signal comprising multiple individual optical signals multiplexed over a common optical medium, changes in refractive index are related to the intensity of the compound signal, and in particular its signal envelope. The Kerr Effect manifests itself with respect to individual optical signals in such a compound signal in several forms, including Self-Phase Modulation (SPM), Cross-Phase Modulation (XPM), and Four Wave Mixing (FWM). These non-linear effects are caused by interactions between light waves travelling in the fibre, and can result in both noise and cross-talk between individual optical signals. Whilst in absolute terms such effects are relatively weak in optical fibres, they do accumulate over long distances. This accumulation effectively imposes practical limits on the length of optical transmission media from which optical signals can be reliably recovered using known technology.

It is known to compensate for these effects in existing systems by detecting and regenerating modulated data signals at intermediate points between source and destination nodes, particularly where the ultimate source and destination nodes are a great distance apart. However, the optical reception and re-transmission apparatus required at such intermediate points may be complex, costly, physically bulky, and may require ongoing expense arising both from powering costs and from maintenance costs. As usual, the overall capital and running costs of this equipment is ultimately borne by the end-customers making use of such communications networks.

Clearly such non-linear characteristics exhibited by known optical fibres represent a significant limit to system performance. Whilst some attempts (for example Large Effective Area Fibre (LEAF), an index profile which results in a larger than average mode field diameter) have been made to overcome Kerr effects these currently provide only small improvements to performance.

Silica fibre exhibits only a positive Kerr Effect: that is the refractive index, N, of the fibre increases with power.

It is therefore desirable to provide improved methods and apparatus which will extend the effective reach of such optical transmission systems in order to reduce the requirement for such regeneration apparatus and thereby mitigate these disadvantages.

Consequently it would be highly desirable to provide a fibre which substantially overcomes the Kerr effect, since the benefits to overall system performance would be technically and commercially very significant, even if the resulting waveguide were to exhibit a moderate excess loss (for example up to 10–20%).

It is also known from "Dopant Dependence of effective nonlinear refractive index in $GeO_2$ and F doped Core Single Mode Fibres", by Kazuhide Nakajima & Masahura Ohashi (IEEE Photonics Technology Letters, Vol. 14, No. 4, April 2002, pp 492–494) to control the non-linear index of refractive index, independently of the refractive index itself.

It is also noted that the requirements of Wavelength Division Multiplexing (WDM) and Dispersion mean that any complete compensation for the non-linear phase shift must operate over a typical scale length of a few meters, because the total intensity waveform within the fibre, evolves along the fibre due to dispersion. This effectively precludes compensation using discrete devices, (unless located every few meters, in which case, the splice losses in to the signal path would be prohibitive).

The present invention therefore seeks to provide improved methods and apparatus for mitigating one or more problems associated with the prior art.

SUMMARY OF THE INVENTION

According to a first aspect of the present invention there is provided an optical waveguide for carrying an optical signal, the signal having a variable intensity profile within the waveguide which varies with optical signal power.

The variable intensity profile may be a variable radial intensity profile.

The variable intensity profile may broaden as the optical signal power increases and this may be at a rate which substantially compensates for waveguide nonlinearity. The waveguide nonlinearity may be predominantly due to the Kerr Effect.

Advantageously, the optical transmission effects resulting from nonlinearities, such as the Kerr effect, are mitigated, allowing optical signals to be transmitted over greater distances without regeneration and hence at lower cost.

The optical waveguide may have an effective refractive index for a longitudinally propagating mode which remains substantially constant as the power of the optical signal increases. A longitudinally propagating mode is a mode which propagates along the length of the optical waveguide, (i.e. in the direction of travel of the signal).

Advantageously, this mitigates or completely compensates for, the effects of the Kerr effect. It is therefore possible to use this technique to under compensate, to exactly compensate or to over compensate for the Kerr effect depending on the detailed requirements for use.

The waveguide may be an optical fibre.

Advantageously, the invention as applied to optical fibre provides the most convenient and flexible form of waveguide for deployment in long-distance optical transmission systems.

The waveguide may be constructed from materials such that the waveguide exhibits a radial increase in the intensity (and therefore power) dependent refractive index in at least part of the waveguide structure The radial increase in the intensity dependent refractive index may be provided by constructing the waveguide from at least two materials, the at least two materials having differing nonlinear coefficients. The optical waveguide may also comprise: at least one annulus surrounding a core, the annulus having a refractive index which increases with optical intensity at a greater rate than the refractive index of the core.

The optical waveguide may comprise a plurality of annuluses.

Doping applied to the core may be the same as doping applied to the at least one annulus.

Doping applied to the core may differ from doping applied to the annulus or to one of the plurality of annuluses.

The optical waveguide may also comprise: a periodic structure surrounding a core. This periodic structure may be a periodic cladding structure.

Advantageously, use of a periodic "cladding" structure (for example Holey Photonic Bandgap fibre or annular Bragg structure) enables enhanced sensitivity of mode field diameter to nonlinear change in refractive index. The periodic structure may use alternating material of almost identical refractive index, but different nonlinear coefficients. In such an arrangement the radial intensity profile of a signal (or mode confinement) has increased sensitivity to optical power.

The periodic structure may have dimensions such as to cause transverse resonance of the forward propagating field within the periodic structure.

Advantageously, a wide range of waveguide constructions is therefore possible embodying the present invention. This allows provision of a range of waveguides which compensate nonlinear effects, such as the Kerr effect to different degrees whilst also providing other transmission characteristics associated with the various known waveguide constructions.

Advantageously, the overcompensation of the Kerr effect within a length of waveguide may, when coupled to a further section of waveguide, compensate for the non-linearity in the further section. This is particularly useful where the over-compensating waveguide section is located substantially at one end of an optical waveguide.

Waveguides according to the present invention may comprise multiple dopants having differing indices and nonlinear coefficients.

Advantageously, this enables tailoring of materials of the same index but different nonlinear coefficients, and vice versa. Waveguides according to the present invention may comprise a periodic cladding structure.

According to a further aspect of the present invention there is provided an optical waveguide comprising a concatenation of a plurality of waveguide sections, of which at least a first waveguide section is a waveguide according to the first aspect of the present invention.

Advantageously, the linear fibre may be combined with potentially less expensive conventional fibre to form a fibre span in a network enjoying the principal benefits of the use of the linear fibre, whilst avoiding some of the additional costs.

The first waveguide section may be located substantially at one end of the optical waveguide.

Advantageously, the first waveguide section may be coupled, in operation, to an optical signal source in such a way that the linear fibre is positioned adjacent the signal source. In this way the compensating effects of the linear fibre are applied at least in the section of the waveguide in which the signal power is greatest. Signal power diminishes significantly with distance from the signal source so that the net effects of the Kerr effect further from the signal source are minimal as compared with those conventionally arising near the signal source.

The first waveguide section may be arranged to over-compensate its own nonlinearity.

Advantageously, the over-compensation in the first section compensates for the non-linearity in the subsequent section(s). This is particularly useful where the first waveguide section is located substantially at one end of the optical waveguide. This also enables use of a slightly shorter first section than when using a compensating waveguide section affording less compensation of the nonlinearity/Kerr Effect.

According to a further aspect of the present invention there is provided an optical transmission system comprising: an optical waveguide according to the first aspect.

Advantageously, such a transmission system may use longer unrepeatered transmission spans than conventional systems without loss of signal integrity thereby reducing system installation and maintenance costs.

The optical transmission system may further comprise: an optical signal source coupled to the optical waveguide; and in which the first waveguide section is located substantially at an end of the optical waveguide adjacent the optical light source.

Advantageously, compensation for the Kerr effect is applied where it is most needed, near the signal source where signal power is greatest and hence the Kerr effect is greatest.

The invention also provides for optical signals carried by such apparatus.

In particular, according to a further aspect of the present invention there is provided an optically modulated signal in an optical waveguide, the optically modulated signal having a variable intensity profile within the waveguide which varies responsive to a change in signal power.

Advantageously, compensation is provided for nonlinear effects, such as the Kerr effect.

The variable intensity profile may be a variable radial intensity profile. The intensity profile may broaden as the signal power increases.

According to a further aspect of the present invention there is provided a method of providing a service over an optical transmission system according to the present invention, the method comprising the steps of: providing a optical signal carrying information relating to the service; transmitting the signal over the optical waveguide.

Advantageously, the signal can be carried over greater distances with greater fidelity, thereby improving the quality of service provided to the service user, potentially at lower cost to at least one of the service provider and the service user.

The key benefits of the invention are that it enables significantly increased launch (and propagation) power, and or significantly reduced nonlinearity. This leads to greater reach, and/or higher signal to noise ratio, enabling modulation formats to be used which are more sensitive to noise and nonlinearity, and might otherwise be unusable.

According to a further aspect of the present invention there is provided an optical waveguide for carrying an optical signal, the waveguide comprising a core and at least one cladding layer, the core and the at least one cladding layer having a cross-sectional profile such that changes in power distribution of the optical signal produce a substantially linear change of phase in the optical signal due to changes in relative fraction of propagating power which propagates in the core and at least one cladding layer.

Compensating phase changes may be substantially equal and opposite to otherwise inherent nonlinear phase shifts occurring in conventional fibres.

Advantageously, substantially linear compensation of the Kerr effect is achieved.

According to a further aspect of the present invention there is provided a waveguide for carrying an optical signal, the waveguide having an optical profile selected to provide a reducing level of nonlinear phase compensation for increased optical signal wavelength. This can compensate for the typical effect of increased mode field diameter with wavelength, which results in reduced fibre nonlinearity with increased wavelength.

According to a further aspect of the present invention there is provided a waveguide for carrying an optical signal, the waveguide having an optical profile selected to provide compensation of optical nonlinearities over a range of optical frequencies.

The optical signal carried in the waveguide may comprise a range of optical frequencies, and the waveguide may have an optical profile selected to provide compensation of the Kerr effect over an extended range of optical frequencies. Furthermore, the optical signal may be a WDM signal comprising a number of individual signals.

The optical waveguide may comprise a core and a cladding. The light-guidance characteristic of the combined core and cladding, may be selected such that the mode field diameter of the optical signal varies responsive to optical signal power.

Preferably, the mode field diameter increases as the signal power increases.

The optical signal power may be the instantaneous optical signal power. Whilst not absolutely instantaneous, the change in signal power is in practice faster than observable through the total optical signal bandwidth, so is "effectively instantaneous".

Advantageously, varying mode field diameter with signal power compensates for nonlinear effects, including the Kerr effect.

Advantageously, this compensates for the reduced Kerr effect due to increasing mode field diameter at longer wavelengths. This is particularly useful for broadband operation of the waveguide.

The invention also provides for a system for the purposes of communications which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 1(a) shows a schematic graph of how signal confinement varies with signal power according to a first embodiment of the present invention;

FIG. 1(b) shows a schematic graph of the index profile of an optical waveguide in accordance with the first embodiment of the present invention;

FIG. 1(c) shows an enlarged potion of the graph of FIG. 1(b).

FIG. 1(d) shows a portion of waveguide according to a first embodiment of the present invention;

FIG. 3(a) shows a schematic graph of how signal confinement varies with signal power according to a second embodiment of the present invention;

FIG. 3(b) shows a schematic graph of the index profile of an optical waveguide in accordance with the second embodiment of the present invention;

FIG. 3(c) shows an enlarged portion of the graph of FIG. 3(b).

FIG. 3(d) shows a portion of waveguide according to a second embodiment of the present invention;

FIG. 4(a) shows a schematic graph of how signal confinement varies with signal power according to a third embodiment of the present invention;

FIG. 4(b) shows a schematic graph of the index profile of an optical fibre in accordance with the third embodiment of the present invention;

FIG. 4(c) shows a portion of waveguide according to a third embodiment of the present invention;

FIG. 6(a) shows a schematic diagram of a length of fibre according to the present invention;

FIG. 6(b) shows a schematic diagram of an optical transmission span according to the present invention;

FIG. 6(c) shows a schematic diagram of service being provided in accordance with the present invention.

DETAILED DESCRIPTION OF INVENTION

Figure 2:
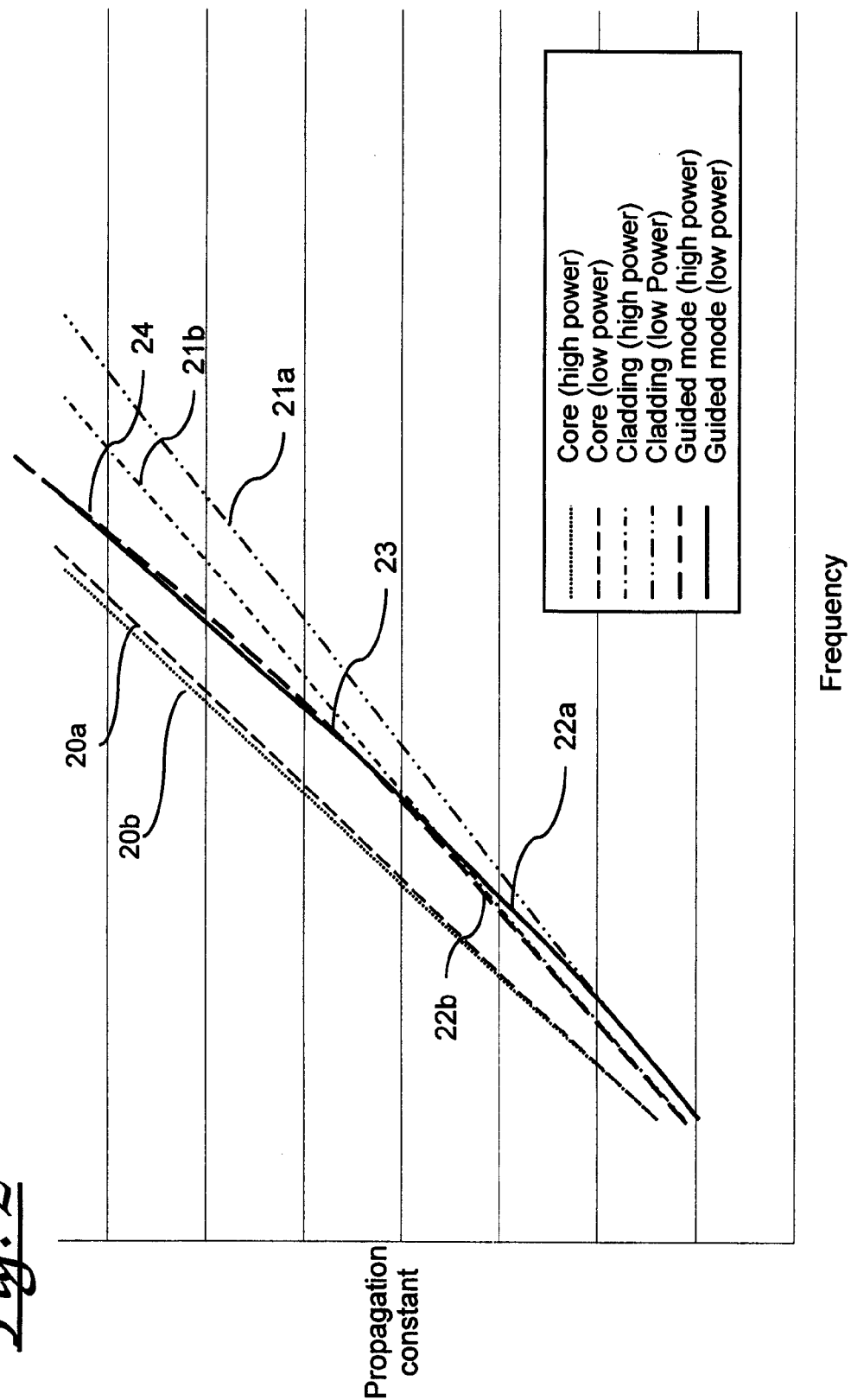
FIG. 2 shows a schematic graph of the relationship between propagation constants and signal frequency in accordance with the present invention.

In the present invention, a solution to the problems caused by nonlinear effects, such as the Kerr effect, lies in decreasing the signal phase shift with increased aggregate signal intensity. This can be achieved by constructing an optical waveguide (and in particular an optical fibre) in which the signal mode field diameter can be made to increase as signal power increases. By doing this, the mean phase shift induced on the signal is reduced as signal power increases. This occurs as a result of the lowering of the effective index of the waveguide caused by the increase in power.

The description herein refers to compensation of the Kerr effect. It should however be understood that this is by way of an example of a nonlinear effect and the technique is applicable also to other nonlinear effects, such as phonon effects.

The Kerr non-linear phase shift is, for example, $2\pi$ over approximately 15 km of fibre. This is equivalent to approximately $10^{-10}$ change in the mean refractive index. For a core refractive index which is 1% higher than the refractive index of the surrounding cladding, a shift of only approximately $10^{-8}$ of the signal power into the cladding is sufficient to compensate the Kerr phase shift. Therefore it is sufficient to provide a fibre in which the mode field diameter increases with power by the order of only $10^{-8}$ to provide a fibre exhibiting substantially no non-linearity.

The term 'spot size' may also be used in the art to refer to mode field diameter. Alternatively the parameter mode field radius may be used. The invention may also be discussed in terms of light-guidance of the waveguide, wherein as the light-guidance decreases, the mode field diameter increases and vice versa.

A number of embodiments are described below which have the desired property of relaxing a light-guidance characteristic with increasing signal power (for example, by increasing mode field diameter with signal power).

The term 'intensity' is used herein and refers to the concentration of power per unit area. At any location along the direction of propagation of the waveguide, the signal power is the total optical energy transferred along the waveguide in unit time. The energy is not distributed uniformly across the waveguide, and is typically concentrated near the centre of the waveguide core. The signal intensity in any region of a transverse section through the waveguide is the power incident on the selected small region, divided by the area of the selected region. It follows that the signal power is equal to the sum of the intensities across all parts of a transverse section through the waveguide. The change in refractive index induced by Kerr effect non-linearity is proportional to optical intensity, and so determines the non-linear distortion in the waveguide.

Referring to FIGS. 1(a–d) a simple linear waveguide comprises a core 17 having a first refractive index 10 surrounded by a cladding layer 16 having a second refractive index 11. As is conventional, the refractive index of the cladding is lower than that of the core in order to provide the waveguide with a suitable light-guidance characteristic so that optical signals may be conveyed along the waveguide with as little loss as possible. However, as optical signals pass through the waveguide, the Kerr effect causes changes both to the refractive index 12 of the core and to the refractive index 13 of the cladding in response to changes in optical signal strength. In the present case the waveguide materials are selected so that nonlinear increases in the refractive index of the cladding are greater than that of the core for a given increase in signal power, so that the difference between the refractive indices of core and cladding reduces as signal power increases. As a result, more of the signal spreads into the cladding as signal power increases (that is, mode field diameter increases with signal power). Consequently, the overall "effective" index of the waveguide is substantially unchanged as signal power increases even though both the core and cladding indices individually actually increase.

FIG. 1(a) shows schematically how signal mode field diameter varies with overall instantaneous signal envelope power. The power distribution 14 of lower power signals within the waveguide concentrates power in the core 14a with some light 14b spreading into the cladding. However, for higher power signals 15, the power distribution is reduced 15a in the core, with more light 15b being carried in the cladding layer.

Increased signal power increases the refractive index of both the core and the cladding, but reduces the difference between the core and cladding refractive indices. Consequently mode confinement decreases, so that the signal spreads out more than in a conventional waveguide and thereby compensates partially, completely, or overly for the Kerr Effect according to the degree to which the effective refractive index of the waveguide is reduced with respect to a conventional waveguide (for example optical fibre).

This is in contrast to conventional waveguides in which light is very slightly more tightly constrained in the core as signal power increases since increasing signal power causes the difference in refractive indices between core and cladding to increase as signal power increases. The present invention therefore operates by providing a waveguide in which the difference between the refractive indices of the core and cladding reduces with increased power (in a conventional fibre design, the difference is almost constant with power, but with a slight increase in difference due to the increased power density, and hence nonlinear index change, within the core).

The disclosure of "Dopant Dependence of effective non-linear refractive index in $GeO_2$ and F doped Core Single Mode Fibres", by Kazuhide Nakajima & Masahura Ohashi provides for the selection of core and cladding materials and dopants suitable for creating such waveguides.

FIG. 2 shows the relationship between the propagation constants and the frequency of the optical wave for the core and cladding materials and the guided mode at low power and at a higher power.

The graph shows traces for the core carrying low power signals 20a and high power signals 20b, the cladding carrying low power signals 21a and high power signals 21b, and the guided mode when carrying low power signals 22a and high power signals 22b.

At higher powers, the nonnalised frequency of the guide at any given frequency is reduced by lowering the core-to-cladding index difference.

At low frequencies, the guided mode follows the cladding line for both the low power and the high power case, therefore possessing a higher propagation constant for the high power case.

As the frequency is raised, the propagation constant of the guided mode rises toward the relevant core value for both high and low power cases, but the rise is faster in the low power case 22a because of the greater normalised frequency.

With a proper difference between the normalised frequencies between the two cases, the propagation constants will cross over 23, such that at over a range of frequencies, the guided mode will possess a lower propagation constant in the high power case.

At the highest optical frequencies, the optical power is confined increasingly in the core, and the propagation constant of the guided mode approaches that of the core material. At these highest optical frequencies, the propagation constant of the guided mode is again higher in the high power case, and there is a second crossover 24.

Between points 23, 24, the propagation constant of the guided mode decreases with power. At either of the crossover points 23, 24, the propagation constant of the guided mode is independent of power.

Because the index differences are typically small (~1%), and the nonlinear changes are many orders of magnitude smaller, the effects have been exaggerated in the figure. However the mechanism of the perfect nonlinear compensation equally applies.

In the example as shown in FIG. 2, the waveguide design is such that at some intermediate frequency the high and low power curves (22b and 22a) for the modal propagation constant cross (at 23). If they do so, they must cross back (at 24). Typically there may be two crossovers, however in a further aspect of the invention, the fibre profile may be designed such that the curves touch or stay close over an extended frequency range. This will result in a fibre which has negligible power dependence of effective index (non-linearity) over an extended range of optical frequencies, and hence be suitable for Wavelength Division Multiplexed applications.

Referring now to FIG. 3(d), a further embodiment of the present invention comprises an optical fibre comprising a single doped annulus 37 within a holey fibre 36.

In such a holey fibre design, the light is guided by radially positioned holes. The guidance properties of the waveguide are controlled by the size and location of the holes. Techniques for the design and fabrication of such fibres will be known to those skilled in the art.

The main body of the fibre in this case may be made of Silica and the annulus doped with a material (for example Germanium) to give the annulus a greater refractive index than the main body of the fibre. Germania has a non-linear coefficient three times that of Silica.

FIG. 3(b) shows a graph of refractive index, N, across a cross-section of such a fibre, the refractive index 30 of the doped annulus being greater than that 31 of the surrounding fibre.

FIG. 3(c) shows an enlarged portion of the index profile of FIG. 3(b), also illustrating the variation in refractive index of the various portions with signal power. The refractive index of both the annulus and the surrounding fibre varies microscopically with signal power carried in the fibre, but the doped annulus (having a greater base refractive index) exhibits greater non-linear index change 32 with respect to signal power than does the rest of the fibre 33. The difference in refractive index between the annulus and the surrounding fibre increases as signal power increases so that, once again, signal mode field diameter increases with signal power.

FIG. 3(a) shows schematically an example of resulting power distributions within optical fibres having the index profile of FIG. 3(b). At lower signal powers 34 the signal is constrained more narrowly within the core of the fibre with more power 34a constrained within the annulus and relatively less 34b outside the annulus. At higher powers, the power distribution 35 changes so that relatively more power is carried outside the core 35b and less 35a within.

A third embodiment, illustrated in FIG. 4(c), employs a two-dopant fibre design. This arrangement comprises a doped core 46 surrounded by a doped annulus 47 within a cladding material 48, 49. In the case illustrated the doped core 46 has a higher refractive index 40 than that 42 of the annulus 47 which, in turn, has a higher refractive index than that 41, 43 of the surrounding fibre. The prime requirement is to achieve an increased mode field diameter with power, and this can be achieved by either increasing index 42 of annulus 47, or increasing the index 41 of annulus 49 (the inner cladding) relative to the index of the core 46. Suitable dopants include Silicon, Germanium and Fluorine or other suitable elements together with Oxygen to form the oxides such as Silica, Germania etc. Fluorine has the valuable property as a dopant, that it reduces the index of the Silica, and that increased concentration reduces the nonlinearity. For Germania, both increase. Fluorine is valuable since the ratio of the change in nonlinearity to change in index, is different from that of Germanium. Consequently, choice of mixtures of both enables the refractive index and the non-linear coefficients to be independently controlled in Silica which is doped with a combination of the two (by varying the relative proportions).

In one arrangement, the annulus 47 is arranged to have a greater non-linear change in its refractive index with respect to signal power than does the doped core.

In a second arrangement the annulus 49 (the inner cladding) is arranged to have a greater non-linear change in its refractive index with respect to signal power than does the doped core 46.

In a further arrangement core 46 could be undoped Silica. Inner cladding 49 could be doped with Fluorine (possibly co-doped with Germanium). Annulus 47 could be undoped or doped with Fluorine and/or Germanium.

The essence of all these structures is to provide a mode field diameter which increases with power. This is possible by providing a structure in which the index of one or more of the outer portions of the structure, increases more rapidly with power than does the central core. The more layers in the structure, the more the options for increasing the sensitivity of mode field diameter to power.

FIG. 4(a) shows the corresponding power distributions across the core with variation in signal power. Once again, mode field diameter increases with signal power.

FIG. 4(a) shows schematically an example of resulting power distributions within optical fibres having the index profile of FIG. 4(b). At lower signal powers 44 the signal is constrained more narrowly within the centre of the fibre with more power 44a constrained within the core and annulus and relatively less 44b outside the annulus. At higher powers, the power distribution 45 changes so that relatively more power is carried outside the core and annulus 45b and less 45a within. That is, power is dissipated outwards as signal power increases.

Figure 5C:
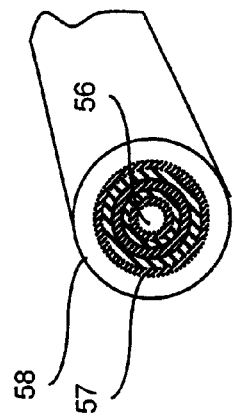
FIG. 5(c) shows a portion of a waveguide according to the fourth embodiment of the present invention.

In a further embodiment, illustrated in FIG. 5(c), enhanced sensitivity of mode field diameter to non-linear change in refractive index is achieved by use of a periodic or photonic crystal "cladding" structure 57 around a core 56 within an outer cladding layer 58. This may consist of concentric annuli, or a two dimensional array.

Figure 5A:
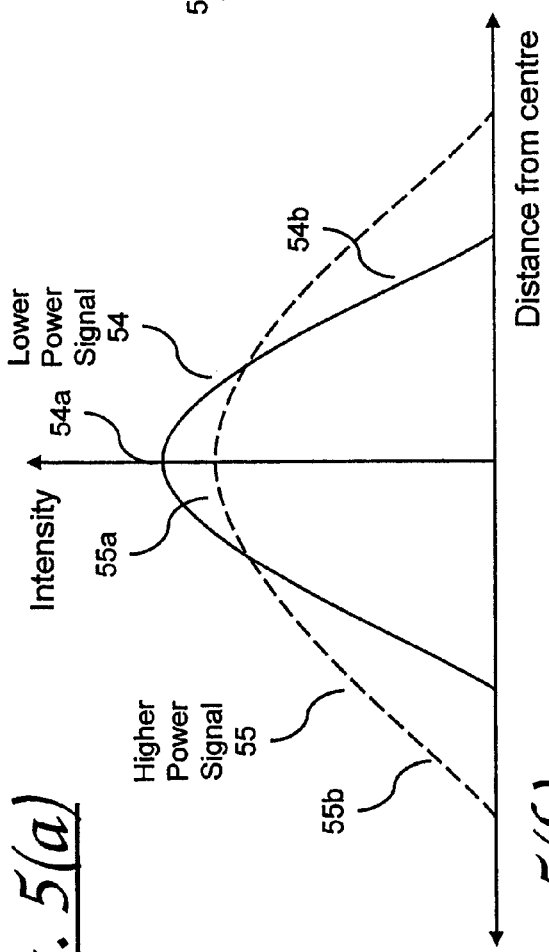
FIG. 5(a) shows a schematic graph of how signal confinement varies with signal power according to a fourth embodiment of the present invention.
Figure 5B:
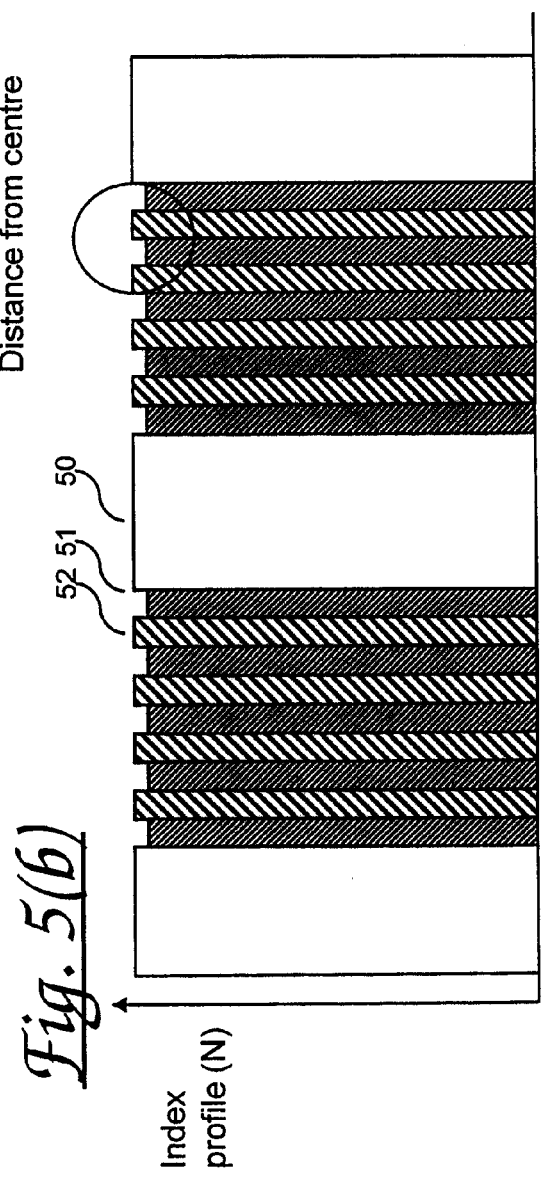
FIG. 5(b) shows a schematic graph of the index profile of an optical fibre in accordance with the fourth embodiment of the present invention.

FIG. 5(b) shows a graph of refractive index, N, across a cross-section of such a fibre. The periodic portion of the structure comprises successive bands 51, 52 of differing refractive index arranged around the core 50. In particular, there are instances of successive bands in which the refractive index 51 of the inner band is lower than that 52 of the outer band as was the case in the second embodiment between the core and the doped annulus.

The dimensions of the periodic structure should be such as to cause transverse resonance (of the forward propagating field) within the periodic structure, and can be predicted (designed) using numerical simulation tools well known to those practiced in the art of fibre design. Adjacent bands of the periodic structure may also exhibit different variations of refractive index with signal power, so that as the signal power varies, so the difference in refractive index between successive bands also varies. Increasing the index of layers 51 to a higher level, as signal power increases, decreases confinement. A periodic structure magnifies the effects of nonlinear induced mode field diameter changes, at resonant frequencies.

By utilising such a periodic structure with alternating material of almost identical index, but different non-linear coefficients, confinement may also be made very sensitive to optical power. Such fibres may be based on holey photonic band-gap fibre or annular Bragg structure.

FIG. 5(a) illustrates once again how signal confinement, and hence mode field diameter, varies with signal power. Once again lower power signals 54 are more closely confined 54a, 54b than are higher power signals 55, 55a, 55b.

Using holey fibre techniques offers the ability to fairly arbitrarily configure the index profile, and the higher non-linearity material can be placed wherever desired.

Turning now to FIG. 6(a–c), a number of applications of this technology are shown. In the arrangement of FIG. 6(a), a length of Kerr-effect compensating waveguide 60a, as described above, is provided as a portion of a longer waveguide structure 60 comprising waveguide sections 60b not employing this technology. In this way, the compensating effects of the new waveguide may be applied where most cost-effective rather than throughout, for example a complete fibre span in a network.

Of particular interest is the arrangement of FIG. 6(b), the arrangement comprising an optical transmitter 61, a receiver 62, and a fibre span coupling the transmitter to the receiver. The fibre span comprises a first section of compensating fibre 60a and a further section 60b of non-compensating fibre. The compensating fibre is located adjacent the optical transmitter 61 since optical signal power is greatest as the signal leaves the transmitter and it is at this point therefore that the Kerr effect is most powerful. Since signal strength drops off rapidly with distance from the transmitter, the Kerr effect arising form the use of conventional fibre 60b in the downstream section of the span is tolerable. Indeed because the majority of distortion associated with the Kerr effect takes place in a relatively short length of the upstream end of a fibre, the majority of the span may be constructed from conventional fibre and still benefit significantly from a relatively short length of compensating fibre at the upstream end.

FIG. 6(c) shows a further application of the compensating fibre to the provision of a communications network in general and specifically the provision of user services over such a network. The network illustrated comprises a network 66 of nodes 67 connected by fibre spans 68, one or more of which may make use of the compensating waveguide described above. Some nodes in the network may act as providers of services 65 or as service users 64, the services being provided to the service users over the network. By employing the compensating waveguide, the services may be provided more reliably over the network, since the messages transmitted are less prone to corruption as a result of the Kerr effect. Furthermore, the use of the compensating fibre allows unrepeatered spans to be longer than when using conventional fibre. As a result the installation and maintenance costs associated with repeatered systems are reduced and/or obviated, and this may result in a cost reduction to the service providers and users using the network. Use of the compensating fibre may therefore provide a more cost-effective communications infrastructure than was previously known, especially for long distance communications.

In summary, the present invention provides for an optical waveguide which provides a power dependent reduction in mode confinement (decreased light-guidance), such as to produce a phase shift that is equal and opposite to the phase shift induced by nonlinear effects. The Kerr Effect in the materials is known to be a dominant cause of these non-linear effects.

The benefit is that the negative effects of nonlinearities, including the Kerr Effect are reduced or eliminated. It therefore enables significantly increased launch (and propagation) power, and or significantly reduced nonlinearity. This leads to greater reach, and or higher signal to noise ratio, enabling modulation formats more sensitive to noise and nonlinearity. Furthermore, as this is a nulling technique, with sufficient accuracy of the design, these deleterious effects may be completely eliminated. This is in complete contrast to other competing methods of reducing nonlinearity, such as LEAF fibre ("Large" Effective Area Fibre), where it is difficult to provide any more than a few dB improvement, however tight the control of the design.

The invention may also provide a waveguide having a profile which ensures that changes in optical signal power produce changes in distribution of power between core and cladding, such that the phase change associated with the changed spatial distribution of the power, is equal and opposite to the phase change due to nonlinear effects, (where the Kerr Effect is the dominant nonlinear effect). The profile may be comprised of 2 or more different optical materials with differing nonlinear coefficients and refractive indices, to enable the changes in power dependant spatial (radial) distribution of power, as required to achieve the above.

The invention may also provide an optical waveguide (for example an optical fibre) whose profile is designed to provide a substantially linear compensation of the nonlinear effects: that is, in which the instantaneous effective refractive index, N, of the waveguide is substantially independent of the optical power of the signal. (Kerr effect causes a substantially linear increase in refractive index with optical intensity. Perfect compensation would require a compensating effect of opposite sign and equal slope, so if the original effect is linear, the compensating effect should ideally be linear also.) This means a waveguide profile with the property that the changes in power distribution (e.g. increased mode field diameter) produce corresponding substantially linear changes of phase due to the change in relative fraction of propagating power which propagates in the core and the cladding materials. The present invention provides an optical waveguide which can be designed to provide under-compensation, perfect compensation or over-compensation for nonlinear effects.

The present invention also provides for optical fibre designs such that these compensating phase changes are substantially equal and opposite in sign to the otherwise inherent non-linear phase shifts occurring in conventional fibres.

Any range or device value given herein may be extended or altered without losing the effect sought, as will be apparent to the skilled person for an understanding of the teachings herein.

The invention claimed is:

1. An optical waveguide for carrying an optical signal, said optical waveguide having a central waveguide portion and an outer waveguide portion, said outer waveguide portion surrounding said central waveguide portion, materials comprising said waveguide portions being arranged such that each of said waveguide portions exhibits an increase in refractive index with respect to an increase in power of an optical signal being carried by the optical waveguide, wherein said materials are further arranged such that a difference between the refractive indices of the waveguide portions reduces as the optical signal power increases.

2. An optical waveguide according to claim 1, wherein said optical waveguide comprises an optical fiber with the central waveguide portion comprising a core of said fiber and said outer waveguide portion comprising a cladding of said fiber, at least one of said core and cladding being doped such that the difference between the refractive indices of the core and cladding reduces as the optical signal power increases.

3. An optical waveguide according to claim 2, wherein said core comprises a doped material having a base refractive index that is higher than that of the material comprising said cladding but such that it exhibits a smaller relative increase in refractive index than that of the material comprising the cladding for a given increase in the optical signal power.

4. An optical waveguide according to claim 1, wherein the materials of the central waveguide portion and the outer waveguide portion are arranged such that the optical waveguide has an effective refractive index for a longitudinally propagating mode of optical signal which remains substantially constant as the optical signal power increases.

5. An optical waveguide according to claim 1, wherein the materials comprising said waveguide portions are arranged such that the optical waveguide exhibits a radial increase in the index in at least parts of the waveguide structure as the optical signal power increases.

6. An optical waveguide according to claim 1, wherein the materials comprising said waveguide portions comprise at least two materials having differing nonlinear coefficients with respect to propagation of an optical signal through the waveguide.

7. An optical waveguide according to claim 1, wherein said optical waveguide comprises an optical fiber with the central waveguide portion comprising a core of said fiber and said outer waveguide portion comprising an inner cladding surrounding said core, an annular waveguide surrounding said inner cladding and an outer cladding surrounding said annular waveguide, at least one of said inner cladding, annular waveguide and outer cladding comprising a material arranged such that the difference between the refractive indices of the core and said at least one of said inner cladding, annular waveguide and outer cladding reduces as the optical signal power increases.

8. An optical waveguide according to claim 7, wherein said core comprises a doped material having a base refractive index that is higher than that of the material comprising any one of said inner cladding, annular waveguide and outer cladding but such that it exhibits a smaller relative increase in refractive index than that of the material comprising any one of said inner cladding, annular waveguide and outer cladding for a given increase in the optical signal power.

9. An optical waveguide according to claim 8, wherein said annular waveguide comprises a doped material having a base refractive index that is higher than that of the material comprising any one of said inner cladding and outer cladding.

10. An optical waveguide according to claim 9, wherein said core is doped with a different material that than of the annular waveguide.

11. An optical waveguide according to claim 8, wherein said inner cladding comprises a doped material having a base refractive index that is higher than that of the material comprising any one of said annular waveguide and outer cladding.

12. An optical waveguide according to claim 1, wherein said optical waveguide comprises a holey optical fiber with the central waveguide portion comprising a core portion of holey fiber and said outer waveguide portion comprising an annular waveguide surrounding said core portion of holey fiber and an outer portion of holey fiber surrounding said annular waveguide.

13. An optical waveguide according to claim 1, wherein said optical waveguide comprises an optical fiber with the central waveguide portion comprising a core of said fiber and said outer waveguide portion comprising at least two annular waveguides surrounding said core and an outer cladding surrounding said annular waveguides, wherein one of said annular waveguides comprises a material arranged such that the difference between the refractive indices of the core and said one of the annular waveguides reduces as the optical signal power increases.

14. An optical waveguide according to claim 13, wherein said core comprises a material having a base refractive index that is higher than that of the material comprising said one of the annular waveguides but such that it exhibits a smaller relative increase in refractive index than that of the material comprising said one of the annular waveguides as the optical signal power increases.

15. An optical waveguide according to claim 13, wherein an inner one of the annular waveguides has a lower base refractive index that an outer one of said annular waveguides but such that it exhibits a larger relative increase in refractive index than that of the outer annular waveguide for a given increase in the optical signal power.

16. An optical waveguide according to claim 13, wherein said at least two annular waveguides comprises a plurality of concentric annular waveguides of differing refractive indices.

17. An optical waveguide according to claim 16, wherein the plurality of concentric annular waveguides comprise successive pairs of annular waveguides in each pair of which an inner annular waveguide has a lower base refractive index than a base refractive index of an outer annular waveguide but such that it exhibits a larger relative increase in refractive index than that of the outer annular waveguide for a given increase in the optical signal power.

18. An optical waveguide according to claim 17, wherein each of the inner annular waveguides of the successive pairs of annular waveguides has a same base refractive index and wherein each of the outer annular waveguides of the successive pairs of annular waveguides has a same base refractive index.

19. An optical waveguide according to claim 18, wherein the arrangement of the successive pairs of annular waveguides is such as to cause transverse resonance of a forward propagating field of an optical signal within said successive pairs of annular waveguides.

20. An optical waveguide structure comprising a concatenation of a plurality of waveguide sections, of which at least one waveguide section comprises an optical waveguide for carrying an optical signal, said optical waveguide having a central waveguide portion and an outer waveguide portion, said outer waveguide portion surrounding said central waveguide portion, materials comprising said waveguide portions being arranged such that each of said waveguide portions exhibits an increase in refractive index with respect to an increase in power of an optical signal being carried by the optical waveguide, wherein said materials are further arranged such that a difference between the refractive indices of the waveguide portions reduces as the optical signal power increases.

21. An optical transmission system comprising an optical waveguide structure comprising a concatenation of a plurality of waveguide sections, of which at least a first waveguide section comprises an optical waveguide for carrying an optical signal, said optical waveguide having a central waveguide portion and an outer waveguide portion, said outer waveguide portion surrounding said central waveguide portion, materials comprising said waveguide portions being arranged such that each of said waveguide portions exhibits an increase in refractive index with respect to an increase in power of an optical signal being carried by the optical waveguide, wherein said materials are further arranged such that a difference between the refractive indices of the waveguide portions reduces as the optical signal power increases.

22. An optical transmission system according to claim 21, further comprising:
an optical signal source coupled to the optical waveguide structure;
and in which the first waveguide section is located substantially at an end of the optical waveguide structure adjacent the optical light source.

23. A method of providing a service over an optical transmission system comprising an optical waveguide having a central waveguide portion and an outer waveguide portion, said outer waveguide portion surrounding said central waveguide portion, materials comprising said waveguide portions being arranged such that each of said waveguide portions exhibits an increase in refractive index with respect to an increase in power of an optical signal being carried by the optical waveguide, wherein said materials are further arranged such that a difference between the refractive indices of the waveguide portions reduces as the optical signal power increases;

the method comprising the steps of:
providing an optical signal carrying information relating to the service; and
transmitting the signal over the optical waveguide.

24. A method of compensating at least partially for non-linear distortion in an optical signal, the method comprising:
providing an optical waveguide for carrying the optical signal, the optical waveguide having a central waveguide portion and an outer waveguide portion, said outer waveguide portion surrounding said central waveguide portion, materials comprising said waveguide portions being arranged such that each of said waveguide portions exhibits an increase in refractive index with respect to an increase in power of an optical signal being carried by the optical waveguide, wherein said materials are further arranged such that a difference between the refractive indices of the waveguide portions reduces as the optical signal power increases, and
transmitting the optical signal using the waveguide thereby to compensate at least partially for phase change of the optical signal due to non-linearity of the materials of the optical waveguide.

* * * * *